| (12) United States Patent | (10) Patent No.: US 10,891,865 B2 |
| Takahashi et al. | (45) Date of Patent: Jan. 12, 2021 |

(54) CONTROL DEVICE FOR LANE DEPARTURE WARNING DEVICE, VEHICLE, AND LANE DEPARTURE WARNING CONTROL METHOD

(71) Applicant: Isuzu Motors Limited, Tokyo (JP)

(72) Inventors: Naoki Takahashi, Chigasaki (JP); Masaichi Takahashi, Yokohama (JP)

(73) Assignee: Isuzu Motors Limited, Tokyo (JP)

( * ) Notice: Subject to any disclaimer, the term of this patent is extended or adjusted under 35 U.S.C. 154(b) by 0 days.

(21) Appl. No.: 16/496,433

(22) PCT Filed: Mar. 19, 2018

(86) PCT No.: PCT/JP2018/010842
§ 371 (c)(1),
(2) Date: Sep. 22, 2019

(87) PCT Pub. No.: WO2018/174016
PCT Pub. Date: Sep. 27, 2018

(65) Prior Publication Data
US 2020/0027353 A1    Jan. 23, 2020

(30) Foreign Application Priority Data
Mar. 23, 2017  (JP) .............................. 2017-057812

(51) Int. Cl.
*G08G 1/16* (2006.01)
*B60Q 9/00* (2006.01)
(Continued)

(52) U.S. Cl.
CPC ............. *G08G 1/167* (2013.01); *B60Q 9/008* (2013.01); *B60W 50/16* (2013.01);
(Continued)

(58) Field of Classification Search
CPC . G08G 1/167; B60Q 9/008; B60W 2050/143; B60W 2510/18
(Continued)

(56) References Cited

U.S. PATENT DOCUMENTS

| 9,802,541 | B2 * | 10/2017 | Nix ..................... B60W 30/095 |
| 10,597,019 | B2 * | 3/2020 | Ito ........................ B60T 8/17555 |
| 2012/0212612 | A1 * | 8/2012 | Imai ...................... B60W 30/12 |
| | | | 348/148 |

FOREIGN PATENT DOCUMENTS

| DE | 102004045103 A1 * | 3/2006 | ............. B60Q 9/008 |
| DE | 102016222502 A1 * | 5/2017 | ............. G08G 1/167 |

(Continued)

OTHER PUBLICATIONS

International Search Report and the Written Opinion dated Jun. 12, 2018 From the International Searching Authority Re. Application No. PCT/JP2018/010842. (6 Pages).

(Continued)

*Primary Examiner* — John A Tweel, Jr.

(57) ABSTRACT

The present invention is configured such that a control device for a lane departure warning device that outputs a warning on the basis of the position relationship of a vehicle and a lane boundary line is equipped with a detection unit for detecting a switch of the main brake from on to off, and a warning control unit for preventing a warning from being issued when the detection unit has detected said switch. The present invention thereby provides a control device for a lane departure warning device that is capable of reducing warnings which could be an annoyance to drivers.

4 Claims, 6 Drawing Sheets

(51) Int. Cl.
   *B60W 50/16* (2020.01)
   *B60W 50/14* (2020.01)
(52) U.S. Cl.
   CPC ... *B60W 2050/143* (2013.01); *B60W 2400/00* (2013.01); *B60W 2510/18* (2013.01)
(58) Field of Classification Search
   USPC .................................................... 340/425.5
   See application file for complete search history.

(56) References Cited

FOREIGN PATENT DOCUMENTS

| | | |
|---|---|---|
| JP | 2003-058993 | 2/2003 |
| JP | 2005-346269 | 12/2005 |
| JP | 2011-121555 | 6/2011 |
| JP | 2013-056636 | 3/2013 |
| JP | 2013-244767 | 12/2013 |
| WO | WO 2018/174016 | 9/2018 |

OTHER PUBLICATIONS

International Search Report and the Written Opinion dated Jun. 12, 2018 From the International Searching Authority Re. Application No. PCT/JP2018/101842. (6 Pages).

* cited by examiner

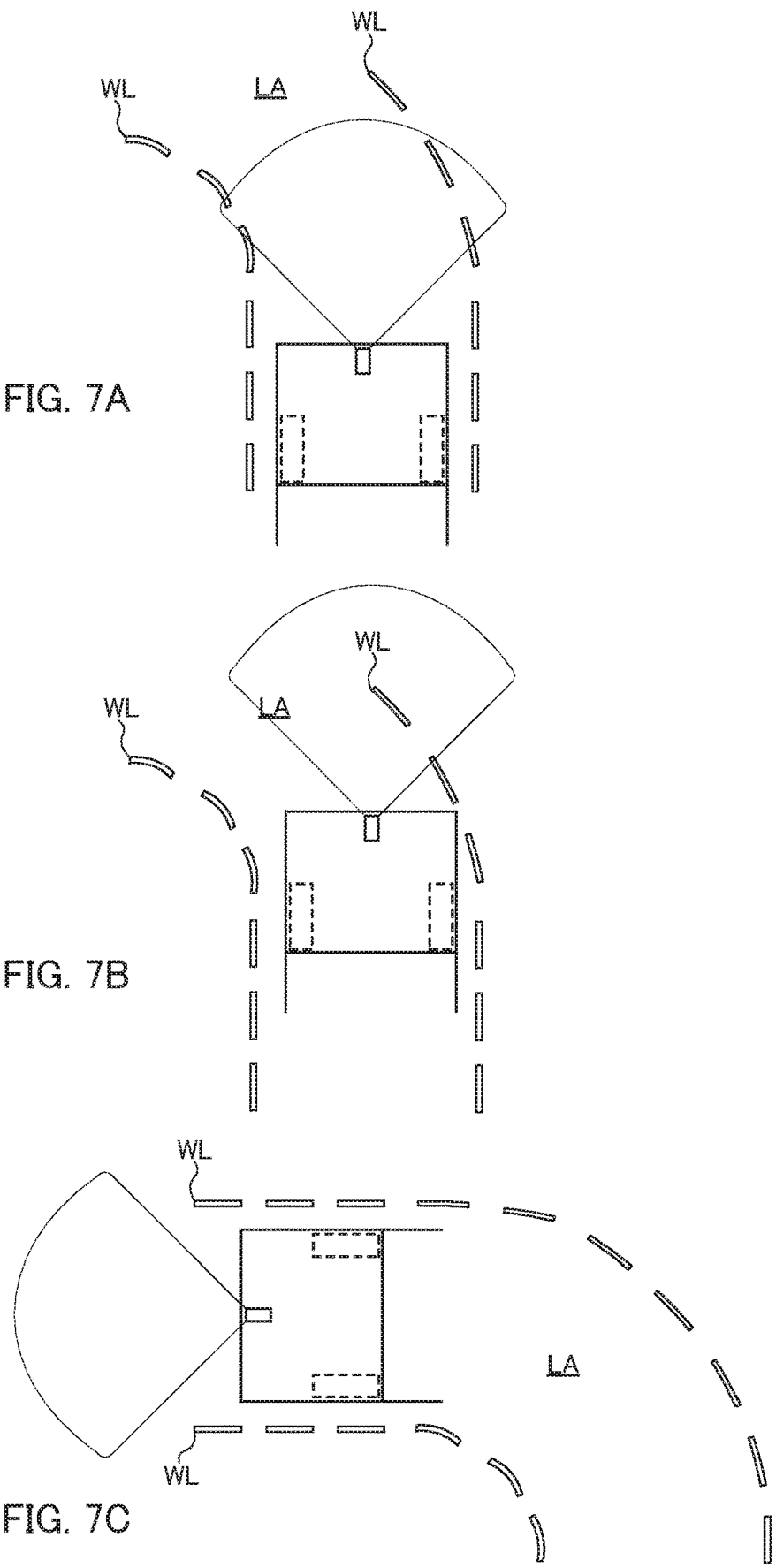

CONTROL DEVICE FOR LANE DEPARTURE WARNING DEVICE, VEHICLE, AND LANE DEPARTURE WARNING CONTROL METHOD

RELATED APPLICATIONS

This application is a National Phase of PCT Patent Application No. PCT/JP2018/010842 having International filing date of Mar. 19, 2018, which claims the benefit of priority of Japanese Patent Application No. 2017-057812 filed on Mar. 23, 2017. The contents of the above applications are all incorporated by reference as if fully set forth herein in their entirety.

TECHNICAL FIELD AND BACKGROUND OF THE INVENTION

The present disclosure relates to a control device for a lane departure warning device, a vehicle, and a lane departure warning control method.

Conventionally, there is a lane departure warning device that determines whether or not a vehicle departs from a lane, on the basis of a detection signal of a steering wheel angle sensor, a camera, a speed sensor, or the like. For example, a lane departure warning device disclosed in PTL 1 issues a warning, when detecting a state in which a vehicle departs from a lane. Consequently, a warning of the departure from the lane is given to a driver.

CITATION LIST

Patent Literature

PTL 1
Japanese Patent Application Laid-Open No. 2013-244767

SUMMARY OF THE INVENTION

Technical Problem

In the case of the aforementioned lane departure warning device, even in a situation in which a warning is unnecessary to driver, the warning is sometimes issued. There is a possibility that the driver feels troublesomeness of such a warning.

An object of the present disclosure is to provide a control device for a lane departure warning device, a vehicle, and a lane departure warning control method capable of reducing a warning causing a driver to feel troublesomeness.

Solution to Problem

A control device for a lane departure warning device, according to the present disclosure is a control device that outputs a warning based on positional relationship between a vehicle and a lane boundary line, the control device for a lane departure warning device, including: a detection section that detects switching from an ON state to an OFF state of a brake; and a warning control section that suppresses output of the warning once the detection section detects the switching.

A vehicle according to the present disclosure includes the control device for a lane departure warning device, described above.

A lane departure warning control method according to the present disclosure is a method performed in a vehicle that outputs a warning based on positional relationship between the vehicle and lane boundary line, the lane departure warning control method including: detecting occurrence of switching from an ON state to an OFF state of a brake; and suppressing output of the warning in a case in which the occurrence of the switching is detected.

Advantageous Effects of Invention

According to the present disclosure, it is possible to reduce a warning causing a driver to feel troublesomeness.

BRIEF DESCRIPTION OF THE SEVERAL VIEWS OF THE DRAWINGS

FIG. 7A is a schematic diagram illustrating a state immediately before a vehicle enters a curve;

FIG. 7B is schematic diagram illustrating a state in which the vehicle enters the curve; and FIG. 7C is a schematic diagram illustrating a state in which the vehicle escapes from the curve.

DESCRIPTION OF SPECIFIC EMBODIMENTS OF THE INVENTION

1. Embodiment

Figure 1:
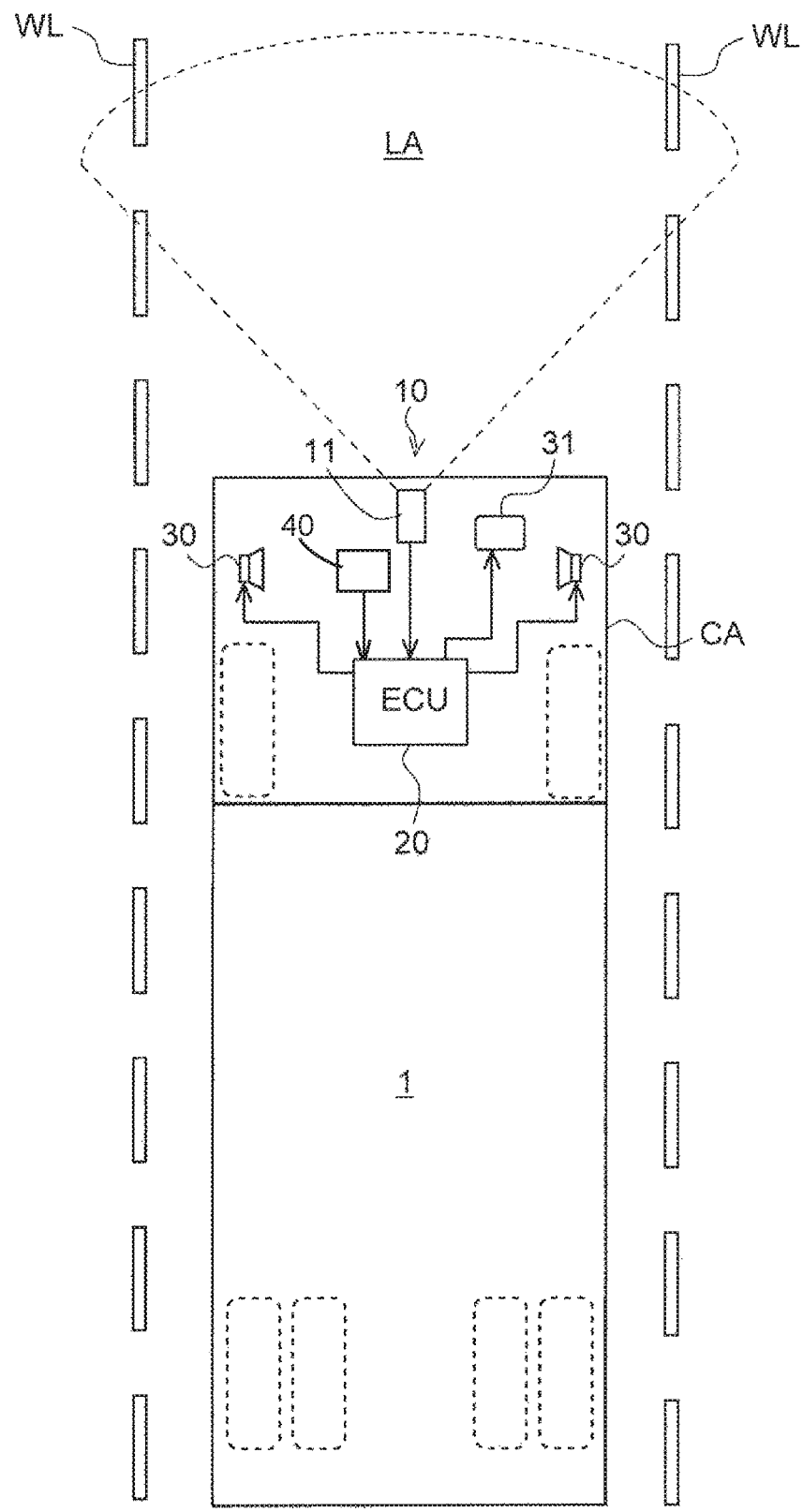
FIG. 1 is a schematic configuration diagram illustrating an example of a vehicle mounted with a lane departure warning device incorporating a control device according to an embodiment of the present disclosure.

Hereinafter, a control device for a lane departure warning device according to an embodiment of the present disclosure will be described with reference to the drawings. Components, the names and the functions of which are the same, are denoted by the same reference numerals, so that description will be made without repeating respective details thereof.

[1.1 Lane Departure Warning Device]

FIG. 1 is a schematic configuration diagram illustrating an example of vehicle 50 mounted with lane departure warning device 10 incorporating electronic control unit 20 that is the control device according to this embodiment.

First, lane departure warning device 10 will be described with reference to FIG. 1. Lane departure warning device 10 is mounted on vehicle 50 (large vehicle) such as a truck, and includes CCD camera 11, electronic control unit (hereinafter simply referred to as an "ECU") 20, speakers 30 that issue acoustic warnings, and display device 31 that issues a display warning.

[1.1.1 CCD Camera]

CCD camera 11 is provided at a front portion of cab CA of vehicle 50. CCD camera 11 images lane boundary lines WL such as white lines and yellow lines on a road surface that divide traveling lane LA of vehicle 50, and transmits the imaged image to ECU 20. A section that detects a lane boundary line is not limited to CCD camera 11, and other known imaging devices, such as a CMOS image sensor, may be applied.

[1.1.2 ECU (Control Device)]

ECU 20 performs various control of vehicle 50, and includes known a CPU, a ROM, a RAM, an input port, an output port, and the like. ECU 20 is an example of the control device for the lane departure warning device according to this embodiment. Accordingly, in the following description, ECU 20 will be described as the control device for the lane departure warning device according to this embodiment.

Figure 2:
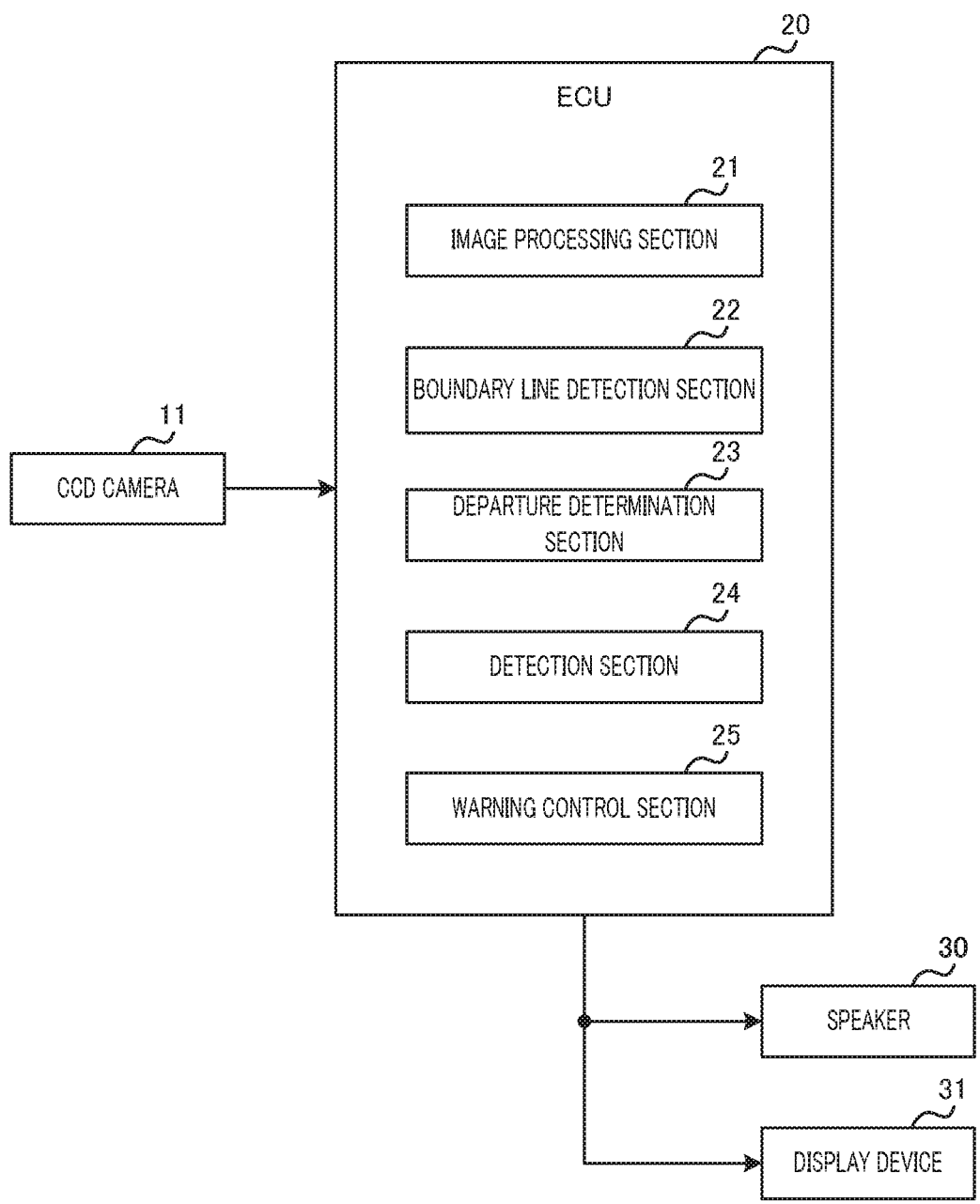
FIG. 2 is a functional block diagram illustrating an electronic control unit for the lane departure warning device.

As illustrated in FIG. 2, ECU 20 includes image processing section 21, boundary line detection section 22, departure determination section 23, detection section 24, and warning control section 25, as part of the functional elements. Description will be made while these respective functional elements are included in ECU 20 being an integrated hardware. However, any of these can be provided in separate hardware.

Image processing section 21 generates a lane boundary line image for recognizing a white line, a yellow line, and the like for dividing traveling lane LA, by applying an image process such as edge extraction to image data received from CCD camera 11.

Boundary line detection section 22 processes the image obtained in image processing section 21 to detect lane boundary lines WL.

Departure determination section 23 determines whether or not vehicle 50 departs from traveling lane LA to outside of detected lane boundary lines WL. Additionally, departure determination section 23 can predict whether or not vehicle 50 is to depart from traveling lane LA to outside of detected lane boundary lines WL.

Detection section 24 detects switching from an ON state to an OFF state of a main brake 40 of vehicle 50. Specifically; detection section 24 detects the switching from the ON state to the OFF state of the aforementioned main brake 40, on the basis of output of a foot brake sensor (not illustrated) provided in vehicle 50. The foot brake sensor is similar to conventionally known various foot brake sensors. Therefore, description regarding foot brake sensor will be omitted.

Detection section 24 can detect the ON state/OFF state of the main brake.

Detection section 24 repeatedly performs the aforementioned detection at predetermined intervals. A method for acquiring output of the foot brake sensor by detection section 24 is not particularly limited. Detection section 24 may actively acquire output of the foot brake sensor, or may passively receive the output of the foot brake sensor.

Once detection section 24 detects the aforementioned switching, detection section 24 transmits, to warning control section 25, a signal indicating that the aforementioned switching is detected. Additionally, detection section 24 may transmit information regarding an ON state/OFF state of an auxiliary brake to warning control section 25. Warning control section 25 may actively acquire a detection result of detection section 24. Thus, a method for delivering information regarding the detection result of detection section 24 between detection section 24 and warning control section 25 is not particularly limited.

When it is determined by departure determination section 23 that vehicle 50 departs from traveling lane LA, warning control section 25 outputs a lane departure warning from warning control section 25. When departure determination section 23 predicts that vehicle 50 is to depart from traveling lane LA, warning control section 25 may output a lane departure warning from warning control section 25.

The lane departure warning from warning control section 25 which includes acoustic warnings by speakers 30 serving as a warning section, and a display warning (for example, letters, a lamp, or the like) by display device 31 serving as a warning section are output. The lane departure warning is not limited to the acoustic warning and the display warning, but may be, for example, warning torque such as vibration of a steering wheel.

On the other hand, once detection section 24 detects the switching from the ON state to the OFF state of the main brake, warning control section 25 controls such that output of the lane departure warning is suppressed (such control is hereinafter referred to as "warning suppression control"). For example, warning control section 25 keeps the aforementioned suppression enabled until predetermined time elapses from the aforementioned switching (hereinafter referred to as "warning suppression time"). Hereinafter, a state in which output of the lane departure warning is suppressed is referred to as a warning suppression state.

Accordingly, once detection section 24 detects the aforementioned switching, even when it is determined by departure determination section 23 that vehicle 50 departs from traveling lane LA, a lane departure warning is not output within the warning suppression time. Consequently, a warning causing a driver to feel troublesomeness is reduced.

However, when it is determined by departure determination section 23 that the degree of departure of vehicle 50 exceeds a predetermined range (for example, a warning threshold value larger than warning threshold value $D_{TH}$ described below) even in the warning suppression state (that is, within the warning suppression time), warning control section 25 may control such that the lane departure warning is output. According to such a configuration, upon departure having a high possibility of requiring a warning, a warning can be output.

In the warning suppression state (that is, within the warning suppression time), once detection section 24 detects a newly performed switching from the ON state to the OFF state of the main brake, warning control section 25 can extend time to suppress the output of the lane departure warning (that is, the warning suppression time). For example, warning control section 25 controls such that the output of the warning is suppressed until the aforementioned predetermined time elapses from the aforementioned newly performed switching.

Once detection section 24 detects the aforementioned switching, warning control section 25 may change warning threshold value DTH used for determination of departure of vehicle 50 by departure determination section 23 to a value at which determination of the departure is loosened compared to the usual state, until the predetermined time elapses from the aforementioned switching. In other words, warning control section 25 may change warning threshold value DTH to a value at which departure of the lane is unlikely to be determined as compared to the usual state (that is, unlikely to output the lane departure warning compared with the usual state).

The aforementioned change can be adjusted in accordance with a method for determining departure of departure determination section 23. For example, when it is determined by departure determination section 23 whether or not vehicle 50 departs, warning threshold value $D_{TH}$ is set to as a departure distance from traveling lane LA, and therefore warning threshold value $D_{TH}$ is set to a value larger than the usual value.

When it is determined that vehicle 50 departs in a state in which warning threshold value $D_{TH}$ is changed as described above, it may be determined that the degree of departure exceeds the predetermined range. In this case, even within the warning suppression time, warning control section 25 may control such that the lane departure warning is output. According to this configuration, upon departure having a high possibility of requiring a warning, a warning can be output.

Warning control section 25 may control such that the lane departure warning is not output during detection of the ON state of the auxiliary brake by detection section 24.

The predetermined time is not limited to a preset fixed value. For example, the predetermined time may be appropriately set in relation to a driving situation (for example, a road situation, a vehicle speed or the like). In a case in which vehicle 50 is traveling on a curve as an example of the driving situation, the length of time before vehicle 50 gets out of the curve (from the state of FIG. 7A to the state of FIG. 7C) may be the predetermined time. Alternatively, in a case in which vehicle 50 is traveling on a construction zone (not illustrated) as another example of the driving situation, the length of time before vehicle 50 gets out of the construction zone may be the predetermined time.

[1.2 Control Operation]

Figure 3:
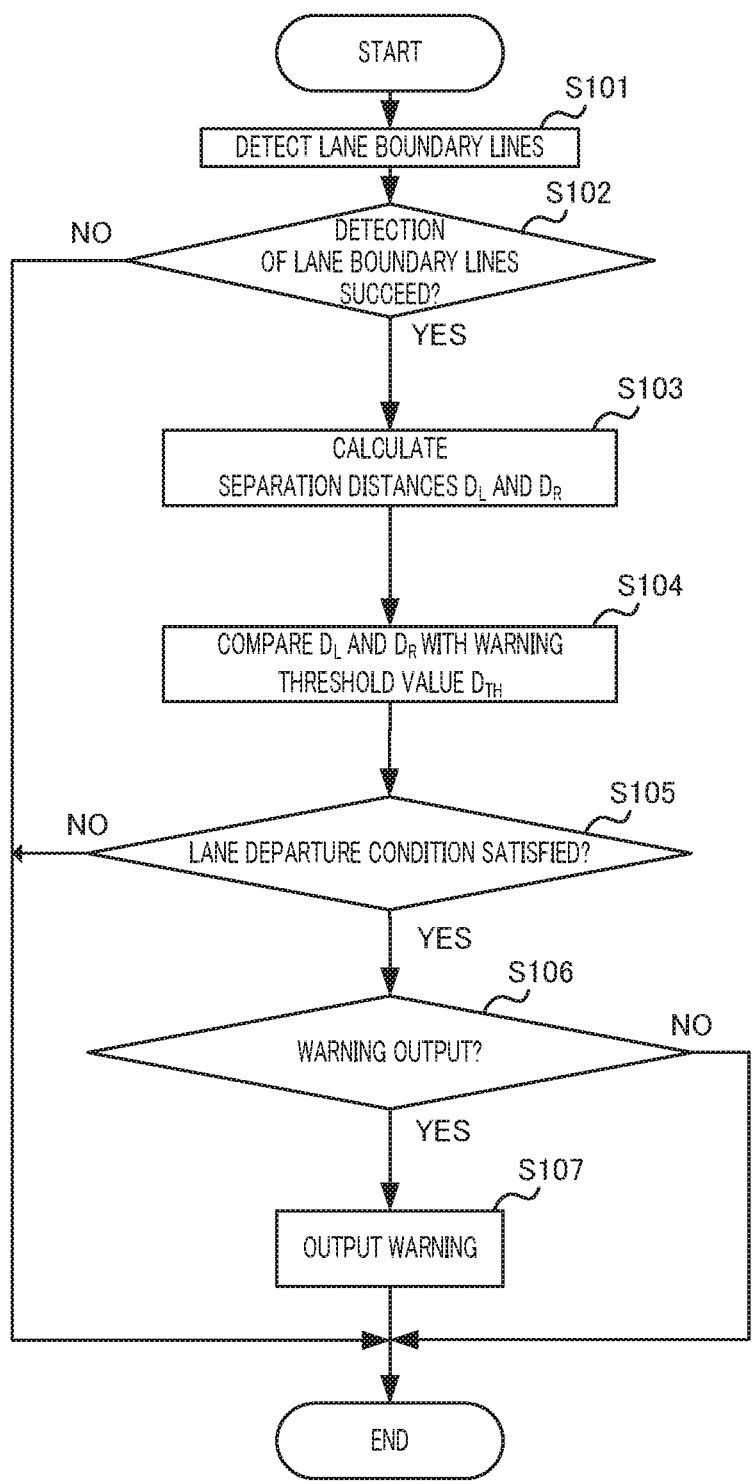
FIG. 3 is a flowchart illustrating control operation of the lane departure warning device.

Now, the control operation of the lane departure warning, and the operation of the warning suppression control performed by the lane departure warning device 10, as described above, will be described. FIG. 3 is a flowchart illustrating the control operation of the lane departure warning performed by the lane departure warning device 10.

Figure 4:
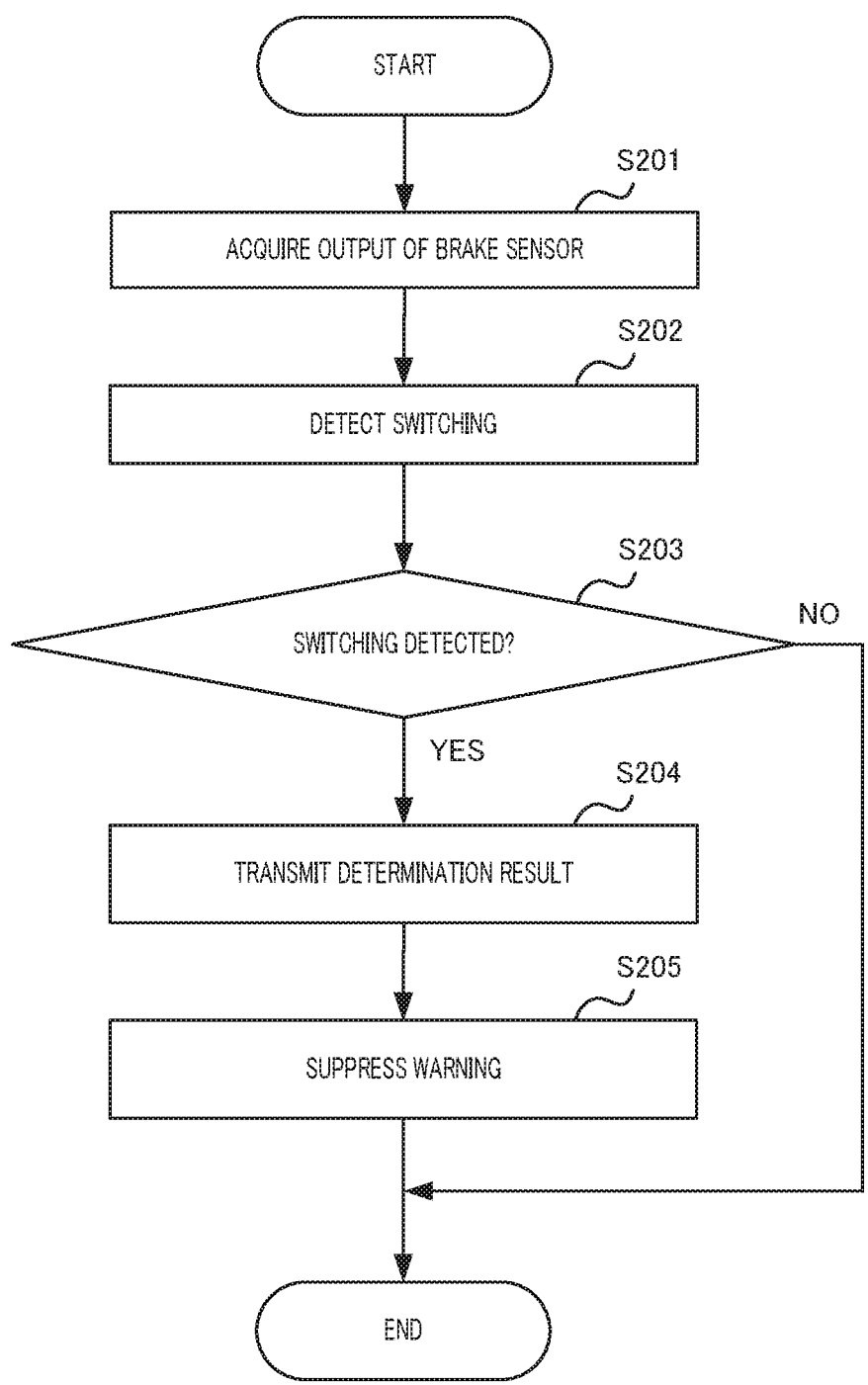
FIG. 4 is a flowchart illustrating operation of warning suppression control.

FIG. 4 is a flowchart illustrating operation of the warning suppression control performed by the lane departure warning device 10. The control operation of the lane departure warning and the operation of the warning suppression control are repeatedly performed at a fixed cycle in ECU 20.

Figure 5:
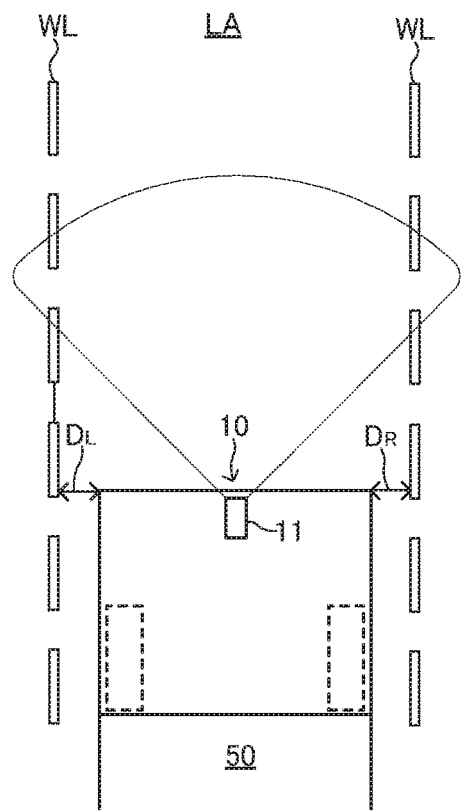
FIG. 5 is a schematic diagram illustrating a first traveling scene example.
Figure 6:
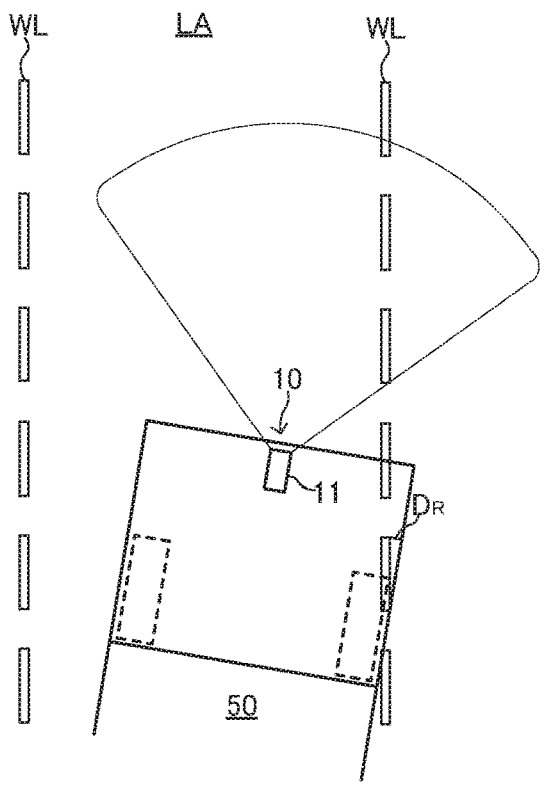
FIG. 6 is a schematic diagram illustrating a second traveling scene example.

FIGS. 5 and 6 are respective schematic diagrams illustrating two examples related to traveling scenes of a vehicle. In the following description, respective control operation examples in the flowcharts of FIGS. 3 and 4 that are applied to first and second traveling scene examples illustrated in FIGS. 5 and 6 are described.

First, control operation in the first traveling scene example illustrated in FIG. 5 will be described. In the first traveling scene example, in a situation in which lane boundary lines on both sides can be identified, a vehicle travels in linear traveling lanes. That is, the first traveling scene example is a usual traveling state.

In the flowchart illustrated in FIG. 3, boundary line detection section 22 detects lane boundary lines WL in Step S101, and a control process shifts to next Step S102.

In Step S102 shifted from Step S101, whether or not detection of lane boundary lines WL succeeds is determined.

There is a scene in which identification of lane boundary lines WL on the both side is difficult, depending on the traveling scene. In this case, boundary line detection section 22 cannot detect lane boundary lines WL on the both sides of vehicle 50 ("NO" in Step S102), and therefore the control process of the lane departure warning is ended.

That is, in a case in which lane boundary lines WL on the both sides are not detected, a process of determining whether or not a lane departure condition described below is satisfied (Step S105) is skipped. As a result, the lane departure warning is not output.

In the first traveling scene example illustrated in FIG. 5, the vehicle is traveling on the traveling lanes in a situation in which the lane boundary lines on the both sides can be identified. In this case, in Step S102, boundary line detection section 22 can detect lane boundary lines WL on the both sides ("YES" in Step S102), and therefore the control process shifts from Step S102 to Step S103.

In Step S103 shifted from Step S102, a separation distance to each of lane boundary lines WL on the both sides detected by boundary line detection section 22 is calculated. Herein, separation distance $D_L$ to left lane boundary line WL from vehicle 50 is calculated, separation distance $D_R$ to right lane boundary line WL from vehicle 50 is calculated, and the control process shifts to Step S104.

In Step S104 shifted from Step S103, detected separation distances $D_L$, $D_R$ to lane boundary lines WL on the both sides are compared with warning threshold value $D_{TH}$ previously stored in departure determination section 23.

Specifically, in Step S104, in a case in which separation distance $D_L$ or separation distance $D_R$ is larger than warning threshold value $D_{TH}$, it is determined that the lane departure condition is satisfied. On the other hand, in a case in which separation distance $D_L$ or separation distance $D_R$ is smaller than warning threshold value $D_{TH}$, it is determined that the lane departure condition is not satisfied.

In a case in which separation distance $D_L$ is larger than warning threshold value $D_{TH}$, it is determined that vehicle 50 departs outside left lane boundary line WL of FIG. 5. On the other hand, in a case in which separation distance $D_R$ is larger than warning threshold value $D_{TH}$, it is determined that vehicle 50 departs outside right lane boundary line WL of FIG. 5.

Then, the control process is shifted from Step S104 to Step S105. Setting of warning threshold value $D_{TH}$ can be preferably changed by user operation, and can be changed, for example, within a range of 0.0 to 0.15 [m].

In Step S105 shifted from Step S104, departure determination section 23 determines whether or not the lane departure condition is satisfied. Herein, in the first traveling scene example illustrated in FIG. 5, the lane departure condition is not satisfied ("NO" in Step S105), and therefore the control process is ended. In this case, the lane departure warning is not issued.

Now, control operation example in the second traveling scene example illustrated in FIG. 6 will be described. In the second traveling scene example, in a situation in which lane boundary lines WL on the both sides can be identified, vehicle 50 starts departing outside lane boundary line WL on one side (right side).

In this case, a control process from Step S101 to Step S105 is similar to the control process in the first traveling scene example.

In the second traveling scene example illustrated in FIG. 6, separation distance $D_R$ is larger than warning threshold value $D_{TH}$. Therefore, a comparison result in Step S104 satisfies the lane departure condition. Therefore, in Step S105, it is determined that the lane departure condition is satisfied ("YES" in Step S105). Accordingly, the control process shifts to Step S106.

In Step S106 shifted from Step S105, warning control section 25 determines whether or not an output process of the lane departure warning is performed. That is, in the control operation of the lane departure warning of this embodiment, even when it is determined that the lane departure condition is satisfied in Step S105, an output process of the lane departure warning is not always unconditionally performed.

Herein, determination to be made in Step S106 will be described. In Step S106, warning control section 25 determines whether or not the warning suppression state is caused by the warning suppression control.

Hereinafter, the warning suppression control will be described with reference to FIG. 4. FIG. 4 is a flowchart illustrating an example of the control operation of the warning suppression control. In a case of this embodiment, the warning suppression control is performed in a flow different from the control operation of the lane departure warning. However, the warning suppression control may be performed as a part of the control operation of the lane departure warning illustrated in FIG. 3.

First, a summary of the warning suppression control illustrated in FIG. 4 will be described. The warning suppression control is control of suppressing output of the lane departure warning by warning control section 25 until the predetermined time elapses from the aforementioned switching, once detection section 24 detects switching from the ON state to the OFF state of the main brake.

Specifically, first, in Step S201, detection section 24 acquires output information of a brake sensor (foot brake sensor in a case of this embodiment) provided in the main brake.

In S202 shifted from Step S201, detection section 24 detects switching from the ON state to the OFF state of the main brake, on the basis of the acquired output information of the brake sensor. A method for detecting the aforementioned switching is not particularly limited.

In S203 shifted from Step S202, detection section 24 determines whether or not the aforementioned switching is detected.

When it is determined that the aforementioned switching is not detected Step S203 ("NO" in Step S203), the warning suppression control is ended. In this case, detection section 24 may transmit, to warning control section 25, information indicating that the aforementioned switching is not detected.

When it is determined that the aforementioned switching is detected in Step S203 ("YES" in Step S203), the process shifts to Step S204.

In S204 shifted from Step S203, the information indicating that the aforementioned switching is detected is transmitted from detection section 24 to warning control section 25.

When the information indicating that the aforementioned switching is detected is received, warning control section 25 controls such that output of the lane departure warning is suppressed until the predetermined time elapses from the aforementioned switching in Step S205. By this control, the state is brought into the warning suppression state in which the output of the lane departure warning is suppressed until the predetermined time elapses from the aforementioned switching.

In Step S205, in a case in which the state is already the warning suppression state, warning control section 25 may extend the warning suppression state. That is, warning control section 25 may control such that the lane departure warning is not output until the aforementioned predetermined time elapses from the aforementioned latest switching.

The operation of the warning suppression control described above is repeatedly performed at a fixed cycle in ECU 20. Then, information as to whether or not the warning suppression state is caused by the warning suppression control is updated at a fixed cycle.

In Step S106 of FIG. 3, warning control section 25 determines whether or not an output process of the lane departure warning is performed, on the basis of a result of the above warning suppression control. Specifically, in Step S106, in the warning suppression state, it is determined that the lane departure warning is not output (that is, "NO" in Step S106). In this case, the control process of the lane departure warning is ended.

On the other hand, in Step S106, in a case in which the state is not the warning suppression state, it is determined that the lane departure warning is output (that is, "YES" in Step S106). In this case, the control process shifts to Step S107.

In S107 shifted from Step S106, the lane departure warning is output from warning control section 25. Then, acoustic warnings by speakers 30, and a display warning (for example, letters, a lamp, and the like) by display device 31 are output.

[1.3 Action and Effects of this Embodiment]

Hereinafter, action and effects of this embodiment will be described. First, in a situation in which a driver switches the main brake from an ON state to an OFF state, it is considered that the driver intentionally operates the vehicle, and therefore even when vehicle 50 departs from traveling lane LA, a warning is often unnecessary. For this reason, in this embodiment, once detection section 24 detects switching from the ON state to the OFF state of the main brake, output of the lane departure warning is suppressed until predetermined time elapses from the aforementioned switching. Consequently, the frequency of warnings that causes a driver to feel troublesomeness is reduced. Time immediately after the driver switches the main brake from the ON state to the OFF state is time immediately after the driver intentionally reduces the speed, and therefore even when a warning is suppressed, the state is unlikely to become unsafe.

[1.4 Additional Remark]

In this embodiment, a case in which the brake is the main brake is described. However, the brake is not limited to the main brake, for example, an auxiliary brake mounted in a large vehicle such as a truck may be used. Example of the auxiliary brake include various auxiliary brakes such as exhaust brake, a compression pressure release brake, and a retarder. In a case in which the brake is the auxiliary brake, the main brake in the aforementioned description may be replaced with the auxiliary brake.

The present application is based on a Japanese patent application (Japanese patent application no. 2017-057812) filed on Mar. 23, 2017, the contents of which is herein incorporated as a reference.

INDUSTRIAL APPLICABILITY

The present disclosure is not limited to a large vehicle such as a truck, and is applicable to various vehicles.

REFERENCE SIGNS LIST

10 Lane departure warning device
11 CCD camera
20 Electronic control unit
21 Image processing section
22 Boundary line detection section
23 Departure determination section
24 Detection section
25 Warning control section
30 Speaker
31 Display device
50 Vehicle
LA Traveling lane
WL Lane boundary line

What is claimed is:

1. A control device for a lane departure warning device that outputs a warning based on positional relationship between a vehicle and a lane boundary line, the control device for a lane departure warning device, comprising:
   a detection section that detects switching from an ON state to an OFF state of a brake; and
   a warning control section that suppresses output of the warning once the detection section detects the switching until a predetermined time elapses from the switching,
   wherein once the detection section detects the switching in a warning suppression state in which the suppression is enabled, the warning control section extends time to suppress the warning.

2. A vehicle, comprising the control device for a lane departure warning device, according to claim 1.

3. A lane departure warning control method performed in a vehicle that outputs a warning based on positional relationship between the vehicle and lane boundary line, the lane departure warning control method comprising:
   detecting occurrence of switching from an ON state to an OFF state of a brake; and
   suppressing output of the warning in a case in which the occurrence of the switching is detected until a predetermined time elapses from the switching,
   wherein once the detecting occurrence of switching is in a warning suppression state in which the suppression is enabled, the warning control method extends time to suppress the warning.

4. A control device for a lane departure warning device that outputs a warning based on positional relationship between a vehicle and a lane boundary line, the control device for a lane departure warning device, comprising:
   a detection section that detects switching from an ON state to an OFF state of a brake;
   a warning control section that suppresses output of the warning once the detection section detects the switching; and
   a departure determination section that determines whether or not the vehicle has departed from the lane boundary line, wherein
   the warning control section is configured to:
      in a warning suppression state in which the suppression is enabled, control such that the warning is not output even when it is determined by the departure determination section that the vehicle has departed from the lane boundary line; and
      when it is determined by the departure determination section that a degree of departure of the vehicle exceeds a predetermined range, control such that the warning is output even in the warning suppression state.

* * * * *